May 2, 1933. L. W. G. FLYNT 1,906,372
SAUSAGE FEEDING AND LINKING MACHINE
Filed March 7, 1928 6 Sheets-Sheet 1

Fig. 1.

INVENTOR.
Louis W. G. Flynt
BY
C. C. Cousins
ATTORNEY

May 2, 1933.  L. W. G. FLYNT  1,906,372
SAUSAGE FEEDING AND LINKING MACHINE
Filed March 7, 1928     6 Sheets-Sheet 3

INVENTOR.
Louis W. G. Flynt
BY
ATTORNEYS.

May 2, 1933.  L. W. G. FLYNT  1,906,372
SAUSAGE FEEDING AND LINKING MACHINE
Filed March 7, 1928  6 Sheets-Sheet 4

INVENTOR.
Louis W. G. Flynt
BY
ATTORNEYS.

May 2, 1933.　　　　L. W. G. FLYNT　　　　1,906,372

SAUSAGE FEEDING AND LINKING MACHINE

Filed March 7, 1928　　　　6 Sheets-Sheet 5

INVENTOR.
Louis W. G. Flynt
BY
ATTORNEY

Patented May 2, 1933

1,906,372

UNITED STATES PATENT OFFICE

LOUIS W. G. FLYNT, OF EAST ORANGE, NEW JERSEY, ASSIGNOR TO AUTOMATIC LINKER, INC., OF NEW YORK, N. Y., A CORPORATION OF NEW YORK

SAUSAGE FEEDING AND LINKING MACHINE

Application filed March 7, 1928. Serial No. 259,646.

This invention relates to machines for feeding and linking sausages.

That part of the meat packing industry relating to the manufacture and production of sausages is met with the requirement that it produce sausages of equal length. Despite the numerous patents which have been issued and the many experiments which have been made in this industry, it has been found impossible to meet this requirement. Therefore, the primary object of this invention is to provide a machine which will produce sausages, made up of links, and to produce links of uniform length. More specifically, the object of the invention is to provide a feeding mechanism which will receive a continuous length of sausage in casings which are of varying diameters, and the speed of which feeding mechanism will be automatically regulated by the diameter of the casing received, with the effect that when a larger casing is received in the feeding mechanism that the speed of the mechanism will be raised and when a smaller casing is received, the speed of the feeding mechanism will be correspondingly decreased. In other words the object of the invention is to compensate for the shortening in varying amounts of the substantially cylindrical casing, due to its conversion, by the twisting and crimping operation, from a cylindrical section of indefinite length into cylindrical sections of definite length, having hemispherical ends.

Figure 1:
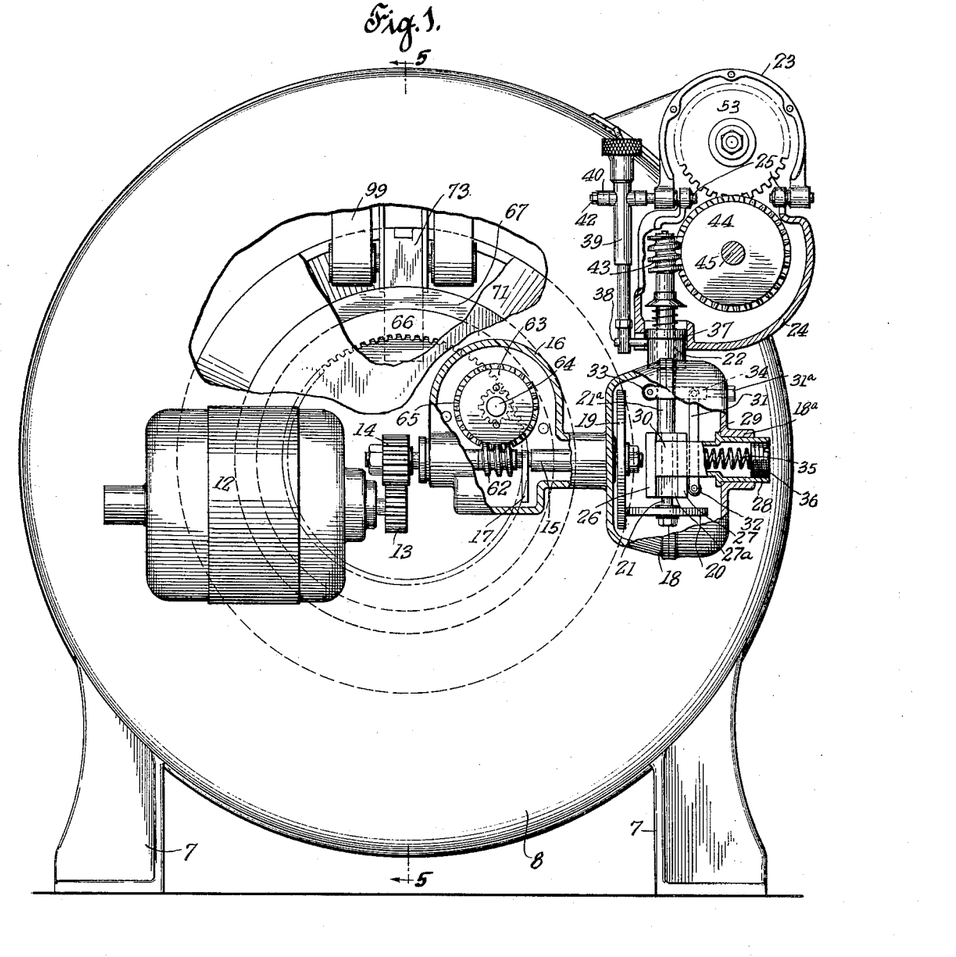
Figure 1 is a rear elevation, parts of the housings being broken away to show the interior parts in elevation.
Figure 2:
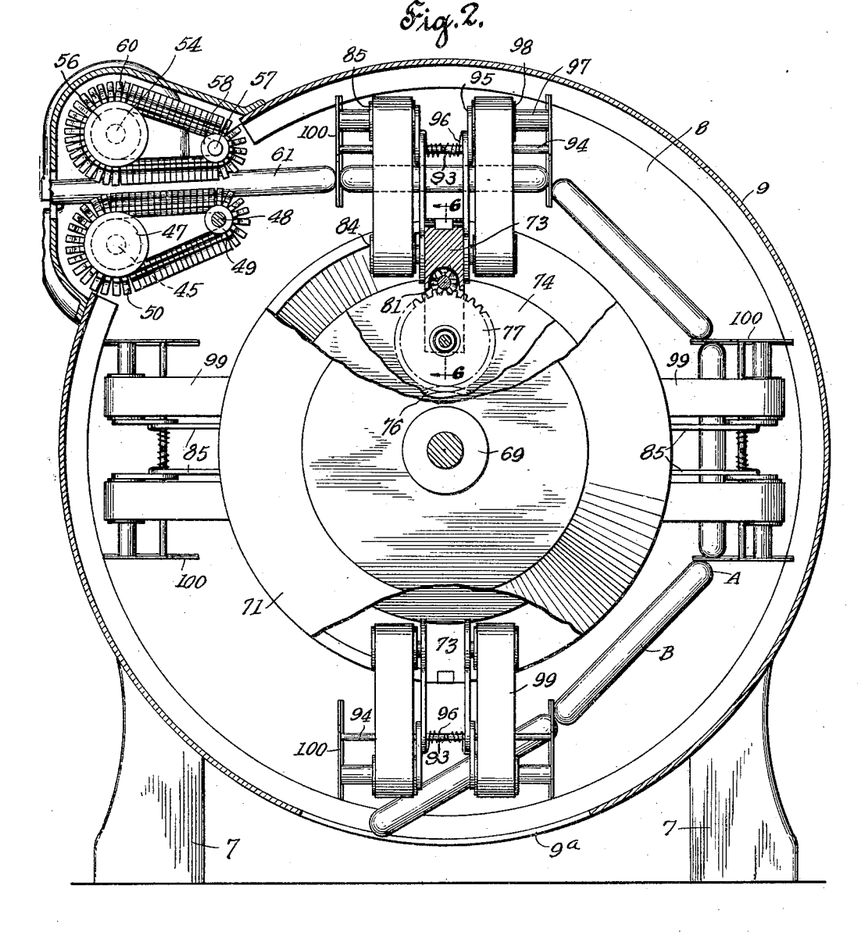
Figure 2 is a vertical section taken approximately on line 2—2 of Figure 5 looking in the direction indicated by the arrow.
Figure 3:
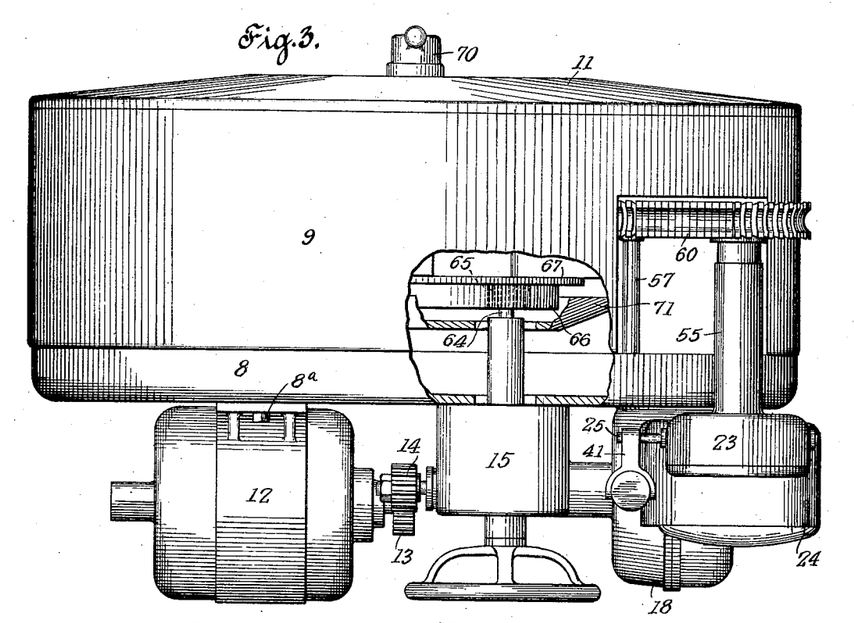
Figure 3 is a plan view, part of the housing being broken away to show interior parts in plan.
Figure 4:
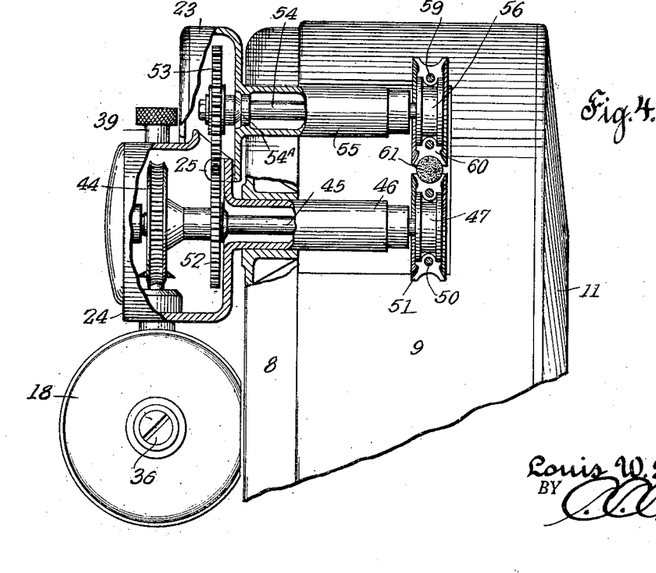
Figure 4 is an elevation of the upper portion of the machine viewed from the left hand side of Figure 2, part of the housing being broken away to show interior parts, partly in elevation and partly in section.

It is known that animal casings vary in diameter and that sausages made from them consist of two definite forms of section, one hemispherical, as indicated at A in Figure 2, and the other cylindrical as at B in Figure 2.

It is obvious, therefore, that the hemispherical end portions will require a greater or less axial length of casing to enclose them as the diameter of the casings vary, the proportion being as diameter is to circumference.

For example, a sausage six inches long and one inch in diameter would consist of a cylindrical portion five inches long and two hemispheres each half of an inch radius. The total length of casing required to enclose the contents would be as follows: Length of cylinder—5", ½ perimeter of each hemispherical end of ½" radius equals .7854, therefore, the sum would be 5" plus .7854 plus .7854 equals 6.57". If the casing were 2" in diameter, the sum would be, cylinder 4", ½ perimeter of each hemispherical end of 1" radius 1.57" or 4" plus 1.57 plus 1.57 equals 7.14".

A further object of the invention is to provide an easily assembled supporting table, adapted to carry the feeding, crimping and twisting assembly on one end and to have an endless conveyor arranged so as to effectively remove the linked sausages as rapidly as they are turned out by the device. More specifically an object of the invention is to provide a unitary construction embodying an easily assembled table, an endless conveyor in the centre of the table and means for operating the conveyor synchronously with the linking machine.

The invention consists of the construction, combination and arrangements of parts, as herein illustrated, described and claimed:—

In the accompanying drawings, forming part thereof, is illustrated a form of embodiment of the invention, in which drawings similar reference characters designate corresponding parts and in which:

Figure 5 is a vertical section taken approximately on line 5—5 of Figure 1 looking in the direction indicated by the arrow; and, Figure 6 is a fragmentary detail in vertical section taken approximately on line 6—6 of Figure 2;

Figure 7 is a fragmentary detail, in side elevation, of one of the crimping plates and some of its connecting parts;

Referring to the drawings 7 designates supporting legs of suitable contour to which is secured or formed integral therewith a main casing 8 forming a support for the entire mechanism hereinafter described. Attached to the casing 8 is a rear end of an open ended housing 9, provided with peripheral flange through which screws 10 may be passed to secure the same firmly to he main casing 8. The housing 9 is provided with an opening 9a in its bottom to permit egress of the finished sausages and is closed by a front wall or cover 11 provided with a small opening 11a in its center, through which may be passed a securing device as hereinafter described. By this means the front wall 11 is easily removable and as further hereinafter described, the entire interior mechanism disposed in the container formed by the casing 8, the housing 9 and the front wall 11 may be readily removed as a unit, it being necessary for the purposes of cleanliness and hygiene to have the same readily accessible and easily removable.

A suitable motor 12 is disposed on the rear wall of the main supporting casing 8 and secured as by suitable bolts 8a. On the projecting end of the shaft of the motor there is disposed a gear 13 in mesh with a similar gear 14 secured on the projecting end of a main drive shaft 15, which projects entirely through a housing 16, also secured to the rear wall of the main casing 8. The gears 13 and 14 are provided, instead of driving the parts hereinafter described primarily from the motor shaft, so as to compensate for the difference in the speed of rotation found in electric motors designed for current having different electrical characteristics, and in order that a uniform speed of rotation may be transmitted to the twisting and crimping elements and the carriers thereof. A suitable splash ring 17 for the purpose of lubricating the parts in the housing 18 is provided.

The other or driving end of the main shaft 15 projects into a housing 18, likewise secured to the rear wall of the main supporting casing 8 and on the end of the shaft 15 inside of the housing 18 is driving disc 19.

Disposed in the housing 18 and in slidable contact with the disc 19 is a driven disc 20 disposed on one end (the lower end) of a shaft 21, in the nature of a floating shaft arranged to have a vertical reciprocatory movement, in order to vary its speed in proportion to the speed produced by the relation of the driven disc 20 and driving disc 19, so that while the driven disc 19 may have a constant rotation the speed of rotation of the shaft 21 will vary as may be required.

A slip bearing 22 is supported by a casing formed of a hinged member 23 and a member 24 fixed on the rear wall of the casing 8, suitable hinge members 25 being used to connect the parts 23 and 24 to form a unitary casing or housing.

One end of the shaft 21 is held for reciprocatory movement by means of a guide block 26, disposed inside of the housing 18, which block is provided with oppositely disposed flat sides 27 one on each of its upper and lower faces, slidably supported by the inner surfaces of a yoke member 28, which adjacent one end is provided with an annular shoulder 29, arranged to bear against the inner wall of one side of the housing 18 and to be retained in position by being inserted in an opening or bore 18a in said housing 18. The inner end of the tubular member 28 may be bifurcated as at 30 and provided with lugs to engage in slots 27a in the flat sides 27, permitting free movement of the shaft 21.

A lever 31 is pivotally supported at its upper end, and at its lower end is provided with a roller 32 adapted to bear against one side of the guide block 26 under the tension of a spring 35 disposed in the tubular member 28 and held under tension by a screw threaded plug 36. Under the tension of the spring 35 the roller 32 is pressed against the bearing block 26 carrying the shaft 21 so that the driven disc is maintained in engagement with the surface of the driving disc 19. The lever 31 is pivoted at its upper end to an adjusting screw 31a provided with a nut arranged at the wall of the housing 18. The inner end of the screw 31a is bifurcated to form a yoke in which is disposed a roller 33 adapted to engage the tubular casing 21a which supports the shaft 21.

The upper end of the sleeve 21a is enlarged at 37 to receive a pin 38, which pin is carried by one end of an adjustable control link 39. The control link 39 is disposed in a bifurcation 40 formed at one end of a link 41 which is carried on the hinged member 23 of the casing formed with the other member 24. A suitable screw pin 42 is used for securing the link 39 to the bifurcation 40. When the hinged member 23 of the casing is rocked on its hinges as hereinafter described, this motion is converted by the bifurcation 40 and transmitted to the connecting link 39 thereby causing a slight reciprocation thereof and through the pin 38 causing movement of the shaft 21 in order to vary its rate of speed as heretofore described.

Disposed on the end of the shaft 21 opposite the end bearing the disc 20 is a worm 43 disposed in mesh with the worm gear 44 on a shaft 45. The shaft 45 is disposed in the tubular bearing 46 carried by the fixed part of the housing 24, which in turn is supported by the rear wall of the main casing 8. Secured on the inner end of the shaft 45 is a flanged spool 47. Disposed in alignment with the shaft 45 is a second shaft 48 carried in suitable bearings in the casing formed by the fixed section 24 of the housing and on said shaft is a spool 49 in alignment with the spool 47.

A suitable flexible and resilient belt 50 is disposed over the spools 47 and 49 and has secured thereon fingers 51, preferably of rubber, and of a contour to receive a filled sausage casing.

A gear 52 is secured on the shaft 45 outside of its tubular bearing 46 and is disposed in mesh with a gear 53 secured on the outer end of a shaft 54, the latter shaft being rotatably supported by a tubular bearing 55, formed similarly to the bearing 46 and in alignment therewith. The oscillation of the gear 53, shaft 54 and tubular extension of hinged member 23 is completely provided for by the pivot pins 25 positioned so that their center lines intersect the pitch circles of the spur gears 52 and 53. It will be noted that the bearing 55 is carried by the hinged portion of the housing so that when the hinged portion of the housing is rocked as hereinafter described, there will be a rocking movement of the bearing and shaft.

Disposed on the inner end of the shaft 53 is a spool 56 corresponding in alignment with the spool 47. A shaft 57 in alignment with the shaft 48 and corresponding thereto carried in suitable bearings in the hinged portion of the housing 24 and has thereon a spool 58 corresponding to the spool 49.

Disposed over the spools 56 and 58 is a resilient and flexible belt 59 corresponding to the belt 50, on the belt 59 of which there are disposed fingers, preferably of rubber, and of a contour to receive a filled sausage casing 61.

It will be apparent that if a sausage casing 61 of a certain diameter is introduced between the belts 50 and 59 and the belts caused to move that the sausage casing will be propelled forward at a given rate of speed. It will further be apparent that when a sausage casing such as 61 of more than ordinary size is introduced that the upper belt 50 will be rocked upward, carrying with it the hinged section 23 of the housing and thereby causing reciprocation of the connecting link 39, and, as described heretofore, the consequent reciprocation of the shaft 21, causing a change in the speed of rotation of said shaft and the consequent greater speed of movement of the belts 50 and 59, and thereby causing the greater speed of the sausage casing 61.

Disposed on the shaft 15, heretofore described, and intermediate of its ends, is a worm 62, disposed to mesh with a worm-wheel 63, secured on a shaft 64. Secured on the shaft 64, is a pinion 65, disposed in mesh with an internal gear 66, which latter in turn is carried by one of two complementary disk shaped members 67. These two complementary members 67 are rotatably disposed on a bushing 68, carried by a quill 69. The quill 69 is carried by a stud 69c, one end of which is supported by the main casing 8, and the opposite end of which projects through the front cover 11 and is adapted to receive the retaining collar 70. When the collar 70 and the cover plate 11 are removed the quill 69 and its associated parts may be easily removed from the stud 69c for the purpose of cleaning, repair or replacement. The quill 69 has secured thereon a threaded collar 69a at its rear end and a similar collar 69b adjacent its front end, so that the cams 71 may be tightly forced into position against the shoulders of the quill 69 and held together.

Carried by the quill 69 is a pair of oppositely disposed cam plates 71, having the opposed cam surfaces 72. Disposed between the cam plates 71 at diametrical points, equally spaced apart, are four blocks 73, evenly separated by sectors 74 and secured together by bolts 75. These blocks form the supporting means for the crimping and twisting mechanism hereinafter described and only one of such mechanism will be described, it being understood that there are four or more complete twisting and crimping elements in the machine.

A central gear 76 is disposed on the quill 69 carried by the stud 69c and fixed against rotation in any suitable way, so that it is disposed in mesh with four planetary gears 77, one of each which is carried by each of the blocks 73. In each instance a shaft 78 is carried by each block 73 to support the corresponding gear 77. In each instance the gear 77 is disposed and meshed with a pinion 79 carried by a shaft 80 and having thereon a pair of spiral gears disposed and meshed with a pair of gears at right angles thereto carried on shafts 83. On the opposite ends of the shaft 83 is secured a pair of pulleys 84.

Disposed on the shafts 83 and rockable thereon are the lower ends of a pair of oppositely opposed arms 85, provided at their lower meeting phases with intermeshing segmental gear teeth 86, so that movement of one of the arms 85 will be communicated to the other arm and all of the parts movable thereby will be synchronously moved.

Figure 10:
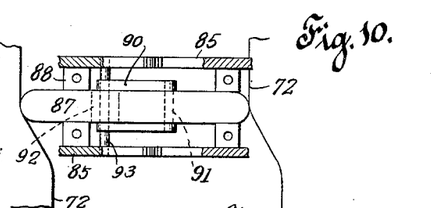
Figure 10 is a fragmentary detail showing the constricting plate operating bar in plan and the operating cams therefor.
Figure 11:
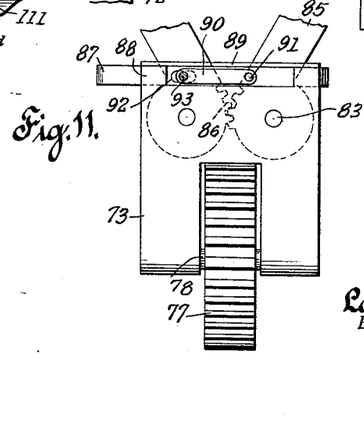
Figure 11 is a fragmentary detail in elevation showing the operating bar and the lower end of the constricting plates supporting arms.
Figure 12:
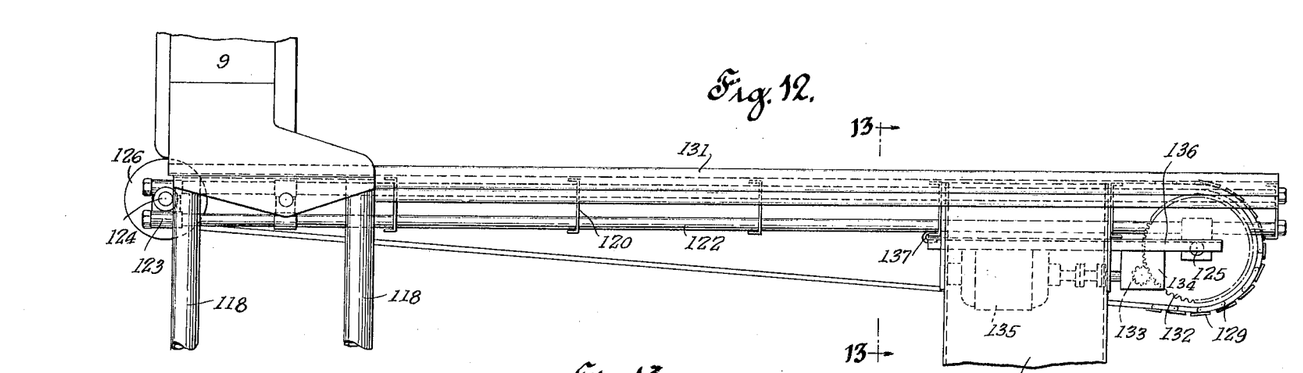
Figure 12 is a side elevation of the supporting and cooperating table.
Figure 13:
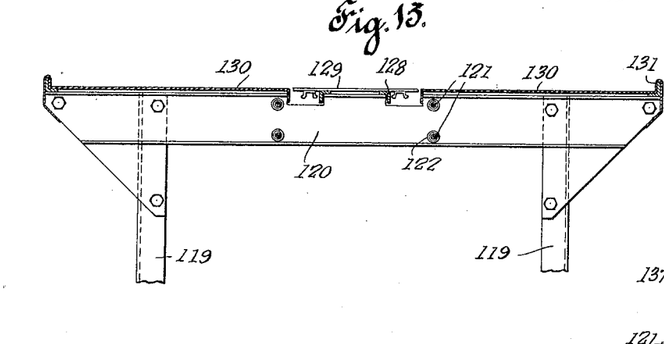
Figure 13 is a transverse vertical section through the table, taken approximately on line 13—13 of Figure 12, looking in the direction indicated by the arrow; and, Figure 14 is a bottom plan view of the discharge end of the table to illustrate the arrangements of hinged motor driving means.
Figure 14:
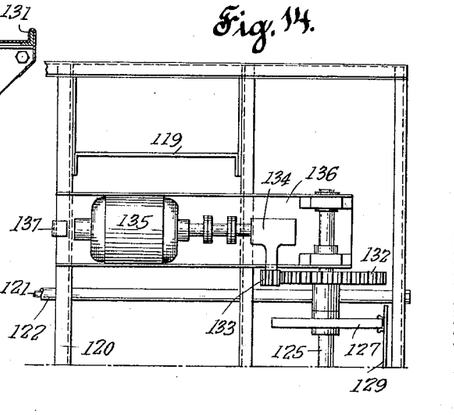

For the purpose of operating the arms 85, a bar 87 is disposed between each complementary pair of arms 85 (see Figure 10) the outer ends of each bar are arranged to bear against the stationary cam faces 72, so that rotation of the disk 67 will cause reciprocation of the operating bar 87. Suitable guide groove 88 is provided at the outer end of the blocks 73, and in which the bars 87 travel. a suitable cover plate 89 is used to close the outer or upper end of the construction.

Disposed on each side of the operating bar 87, is a link 90, and a suitable pin 91 is disposed through the bar 87, and through the inner end of the links 90 to form a pivotal connection between the links 90 and the operating bar 87. Disposed through each corresponding arm 85 of one complementary pair is a pin 93, which passes through the ends of the links 90 opposite to the end of the links supported by the pivot 91. A suitable opening 92 is formed in the bar 87 of larger dimensions than the pin 93, to permit a slight clearance rendered necessary by the movement of the arms 85. As the movement of the cam faces actuates the operating bar 87 by the construction described, the arms 85 in complementary pairs, are caused to oscillate on the shafts 83.

Carried at the upper end of each opposite pair of arms 85 is a shaft 94, to each of which is pivoted links 95 maintained under tension outwardly by means of a central spring 96 (see Figure 2).

Suitable supporting shafts 97 are carried by each pair of links 95 and arranged thereon are pulleys 98 corresponding in alignment with the pulleys 84, over which pulleys are disposed suitable belts 99, arranged to contact with and rotate the sausage B, when it is constricted as hereinafter described.

Figures 5, 6, 7:
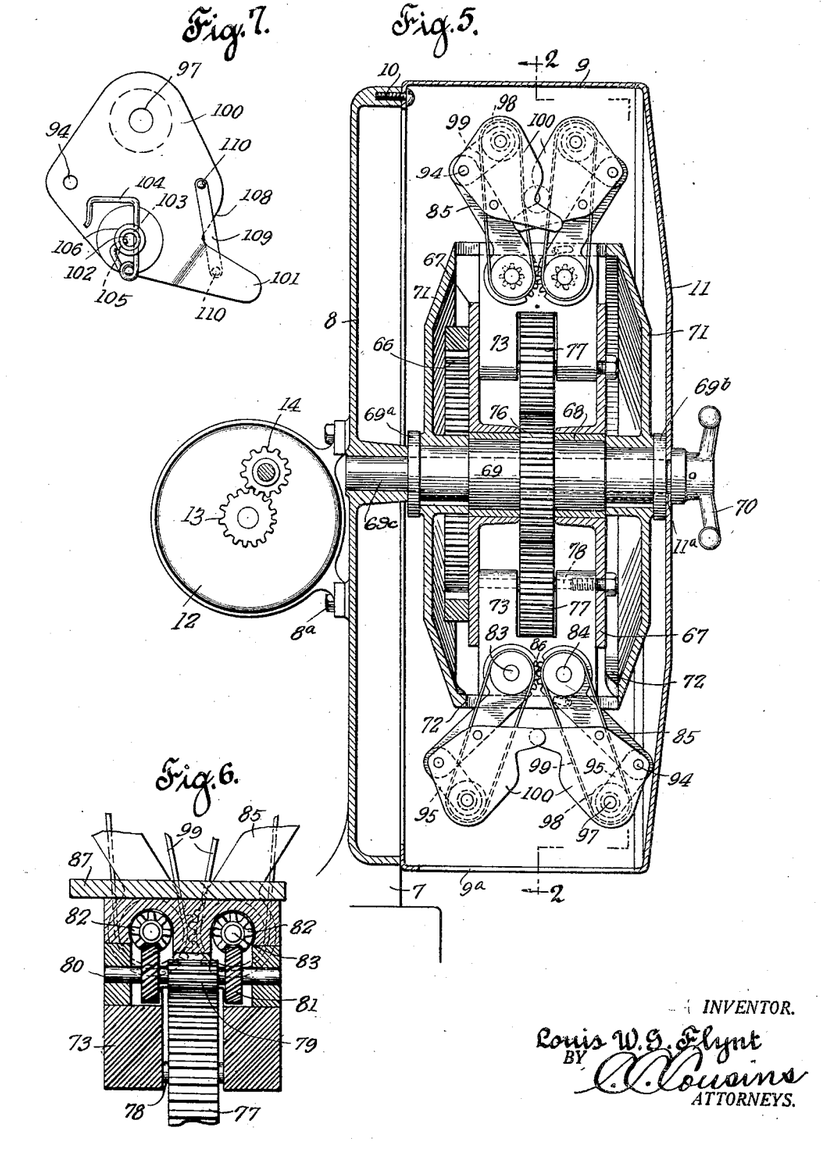

A pair of complementary oppositely disposed constricting plates 100 (see Figure 7) are provided with offset ends 101, and are arranged in complementary opposite pairs rockably disposed on pins 102 carried on the arms 85. The pin 102 is provided with a transverse slot 103, arranged to receive the body portion of a retaining spring 104, the end 105 of said spring being bent into a suitable opening in a bushing 106, secured on or formed integrally with the plates 100.

The plates 100 are each provided with a recess 108 adapted to be bridged by a body of resilient material 109, one end of the body 109 being secured to a pin 110, on one side of the plate 100 and a corresponding pin securing the opposite end of the resilient body 109 to the opposite end of the plate 100. By this construction is provided a resilient means for gripping the sausage B when it is caught between the constricting plates 100.

The spiral gears 81 (best shown in Figure 6) are shown as left handed thereby producing rotation of the twisting belts in one direction. If the next twisting unit has its gears 81 cut as right hand spirial gears, the rotation of the belts driven therefrom, will be in an opposite direction. This end is highly desirable as it results in minimizing the tendency to unwind the crimped and twisted casing after its discharge from the machine.

Figures 8, 9:
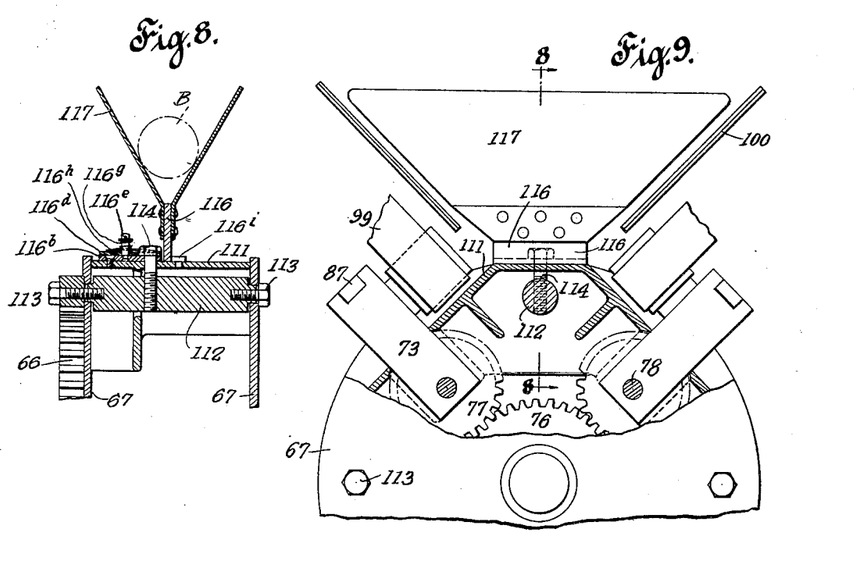
Figure 8 is a fragmentary detail, in vertical section, taken approximately on line 8—8 of Figure 9, illustrating the positioning and supporting web and guide trough.
Figure 9 is a transverse vertical section through the sector plate showing the guiding trough and some connected parts in elevation.
Figure 8A:
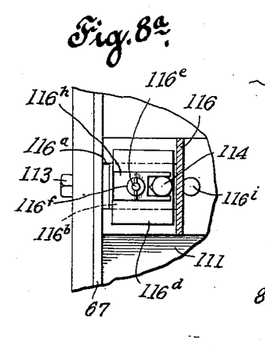
Figure 8a is a fragmentary detail in enlarged vertical section through the guiding trough and connecting parts.

Disposed between each of the described constriction and twisting units is a webbed sector spacer 111, carried between the two complementary members 67 heretofore described. Carried between the members 67 beneath each sector spacer 111 is a supporting bar 112, which may be secured in place as by means of the bolts 113 (Figure 8). A suitable securing screw 114 is disposed through a portion of the sector spacer 111 and into the supporting bar 112, so that the sector spacer may be compressed radially into engagement with the surfaces of the suporting blocks of the crimping and twisting units thereby securing uniform angular disposition thereof.

Disposed on each sector spacer 111 is an angle iron supporting member 116, the horizontal web of which is disposed on the outer face of the sector spacer 111 and is provided with a slot 116a, the walls of which slot engage around a strip 116b, disposed on the upper face of the sector spacer 111 and secured thereto by the screw 114 and screw 116i.

By this means the supporting member 116 may be conveniently slid onto the upper surface of the sector spacer 111, suitable guide and restraining stud 116i being provided for positioning member 116. A suitable headed stud 116e is secured to the plate or strip 116b and projects upward through a locking strip or plate 116d of greater width than the slot 116a, so that the horizontal web of the member 116 is held against sector plate 111 by the tension of a spring 116g interposed between the upper surface of the clamping plate 116h and the head 116f of the stud 116e. By this construction the supporting member 116 may be readily removed and readily replaced in exact position.

Secured to the vertical web of the angle iron 116, intermediate of each of the twisting and crimping elements are oppositely opposed angular plates 117, approximately bridging the space between adjacent crimping and twisting elements and arranged in the path of movement of the sausage casing which is being twisted into links. The function of the trough 117 is to support the sausage casing B in its movement through the machine.

The unitary construction described is disposed over one end of a table comprising suitable standards 118 at one end, hereinafter referred to as the feed end of the table, and other vertical standards 119 at the opposite or discharged end of the table. Suitable horizontal channel irons are connected by through rods 121, sleeves 122 and castings 123 at opposite ends of the table and disposed on and secured to the vertical supporting standards 118 and 119, providing a construction embodying great rigidity and ease and quickness of assembly.

Disposed transversely of the construction, at the front or feed end is a shaft 124, and disposed at the opposite or discharge end, is a corresponding drive shaft 125. Suitable sprocket wheels 126 are disposed on the shaft 124, and corresponding sprocket wheels 127 are disposed on the drive shaft 125, and conveyor chains 128 are disposed over the sprockets and carry transverse closely arranged slats 129, providing endless conveyor starting immediately beneath and cooperating with the entire linking mechanism hereinbefore described. Disposed on each side of the conveyor, on the cross pieces 120, are cover plates 130 having at their outer edges a vertical lip or wall 131.

Disposed on the drive shaft 125 is a gear 132 disposed to mesh with a pinion 133 connected with, and driven by a speed reducing unit 134 driven by a motor 135. The motor 135 is carried by a frame 136 journalled on one end of the driving shaft 125 and arranged to be retained in horizontal or operative position by means of a clip 137 carried on the underside of the table. The electrical connection, or motor 135 is not shown, but in practice goes to the same source of electricity as is used to operate the motor 12, driving the feeding, twisting and crimping mechanism, hereinbefore described, so that the entire operation of all of the parts is synchronized. Actual experiment with the described feeding, twisting and crimping mechanism has shown that by having a table of the described character, whose movement is synchronized, that the output of the machine increases the efficiency by at least thirty percent.

Having thus fully described the invention, what is claimed as new and desired to be secured by Letters Patent, is:—

1. The herein described method of forming links in sausages which consists in first forming and then feeding a casing into constricting and twisting elements at a rate of speed proportionate to the diameter of the fed casing.

2. In a sausage linking machine, a combination comprising constricting and twisting means and an automatically self regulating feeding means arranged to feed a casing to the constricting and twisting means at a rate of speed in proportion to the diameter of the casing.

3. In a sausage linking machine, a feeding mechanism comprising a pair of tractive carriers, movable with relation to each other and a variable speed driving means for the carriers controlled by the position of the carriers with relation to each other.

4. In a sausage linking machine, a feeding mechanism comprising a plurality of tractive members arranged to be separated by a casing inserted therein, variable speed driving means for the carriers and means for operating the driving means.

5. In a sausage linking machine in combination with constricting and twisting elements, feeding means adapted to receive a casing, and means for driving the feeding means comprising a floating driving shaft, a friction disk on the driving shaft and means for driving the friction disk.

6. In a sausage linking machine the combination comprising a feeding means, constricting and twisting means, and means operated by a gear shaft to synchronously operate the feeding means at variable speeds and to operate the constricting and twisting elements.

7. In a sausage linking machine, a supporting element, a supporting stud carried by the supporting element, constricting and twisting elements and means for operating the same supported on the stud and means for securing the constricting and twisting elements and their means of operation to permit the entire structure to be easily removed from the stud.

8. In a sausage linking machine, the combination comprising a supporting element, power driving means carried by the supporting element, a variable speed feeding means carried by the supporting element and a removable unit carried by the supporting element in alignment with the feeding means and having a plurality of constricting and twisting elements and means for operating same.

9. In a sausage linking machine, a supporting element, a stud carried by the supporting element, a quill removably disposed on the stud, securing means disposed on quill, cam plates disposed between the securing means on the quill, supporting means carried between the cam plates, constricting and twisting elements carried by the supporting means and means for operating all of these elements from a main source of power.

10. In a sausage linking machine the combination comprising a supporting element, a stud carried by the supporting means, a quill disposed on the stud and removable therefrom, other means for securing the quill on the stud, a pair of cam plates on the quill, an internal gear disposed on the quill and arranged to be operated by the power means, a spool arranged to be operated by the internal gear, a planetary gear assemblage adapted to be rotated by movement of the spool, and a plurality of units of twisting and constricting elements arranged to be operated by the planetary gear assemblage.

11. In a sausage linking machine, a combination comprising a pair of oppositely disposed disks having cam faces thereon, a plurality of supporting blocks disposed between the disks and means for rotating said blocks, operating bars carried by the supporting blocks and movable with relation thereto and arranged so that their ends contact the cam faces and twisting and constricting elements carried by the blocks and arranged to be operated by movement of the operating bars.

12. In a sausage linking machine, the combination comprising a plurality of linking and twisting unit assemblages, arranged at radial points of a circle, means for synchronously operating this assemblage successively, a feeding means associated therewith and means for actuating the feeding means at a rate of speed proportioned to the diameter of a casing fed thereto.

13. In a sausage linking machine, the combination comprising a plurality of linking and twisting unit assemblages, arranged radially in a circle, means for synchronously operating this assemblage successively, a feeding means associated therewith, means for actuating the feeding means at a rate of speed proportioned to the diameter of a casing fed thereto, and removable guide troughs disposed between each of the constricting and twisting element assemblages.

14. In a sausage linking machine, the combination comprising a supporting table having a pair of fixed upper surfaces and a movable conveyor belt disposed intermediate thereof, a sausage linking and twisting assemblage disposed on one end of the table immediately over the movable section, and means for synchronously operating the sausage twisting and linking elements with the movable section of the table.

15. In a sausage linking and twisting machine, the combination comprising a supporting table formed of a framework and a movable platform, feeding, constricting and twisting elements supported over one end of the movable platform of the table, and means carried by the underside of the table to drive the movable platform of the table synchronously with the twisting and linking elements.

16. A constricting plate for a sausage machine comprising a thin body having an opening therethrough, a friction increasing element disposed on the thin body of metal, and means for removably securing the thin body of metal to a supporting shaft.

17. A constricting plate comprising a body of metal having a recessed portion and a resilient gripping element carried so as to lie across said recessed portion.

In testimony whereof he affixes his signature.

LOUIS W. G. FLYNT.